United States Patent [19]

Shephard

[11] Patent Number: 4,652,772

[45] Date of Patent: Mar. 24, 1987

[54] ELECTRIC CABLES

[75] Inventor: Richard W. Shephard, Southampton, England

[73] Assignee: Allied Corporation, Morris Township, Morris County, N.J.

[21] Appl. No.: 777,398

[22] Filed: Sep. 19, 1985

[30] Foreign Application Priority Data

Sep. 26, 1984 [GB] United Kingdom ................ 8424285

[51] Int. Cl.⁴ ............................ H01B 7/08; H0G 3/00
[52] U.S. Cl. ..................................... 307/147; 174/48;
174/72 TR; 174/117 F; 174/117 FF
[58] Field of Search ............ 174/117 FF, 117 F, 115,
174/48, 72 R, 72 TR; 307/147, 42

[56] References Cited

U.S. PATENT DOCUMENTS

| 3,582,532 | 6/1971 | Plummer | 174/36 |
| 3,612,743 | 10/1971 | Angele | 174/117 FF X |
| 3,757,029 | 9/1973 | Marshall | 174/117 FF X |
| 3,860,739 | 1/1975 | Kloth et al. | 174/48 |
| 4,172,962 | 10/1979 | Legerius et al. | 174/48 X |
| 4,219,928 | 9/1980 | Kuo | 174/117 FF X |
| 4,319,075 | 3/1982 | Willette | 174/117 FF |
| 4,323,949 | 4/1982 | Guritz et al. | 174/48 X |
| 4,417,096 | 11/1983 | Willette | 174/117 FF X |

FOREIGN PATENT DOCUMENTS

| 1104098 | 2/1968 | United Kingdom . |
| 1180179 | 2/1970 | United Kingdom . |
| 1258702 | 12/1971 | United Kingdom . |
| 1357186 | 6/1974 | United Kingdom . |
| 2052181 | 1/1981 | United Kingdom . |
| 2052134 | 1/1981 | United Kingdom . |
| 2070320 | 9/1981 | United Kingdom . |
| 2139805 | 11/1984 | United Kingdom . |

OTHER PUBLICATIONS

Electrical Review 1984, 214, No. 7, pp. 19 and 21.
Electrical Review 1965, 177, p. 278.

Primary Examiner—Morris H. Nimmo
Attorney, Agent, or Firm—Roger H. Criss

[57] ABSTRACT

A flat electrical cable for power distribution is designed for undercarpet use and has two side-by-side live and neutral conductors 12,14 formed into a package 15 by insulation 16,18 around them. In a three-phase construction there are four conductors (FIG. 5). A conductive earthing screen 26 forming the sole earthing conductor overlies the package 15 and is of the same width as the package but is not bonded or only lightly bonded to it. An outer insulating layer 28 tightly surrounds the screen 26 and package 24 and holds them together at the edges, as well as providing protection along the cable edge. The layer 28 is formed of strips 30,32 which can be cut away at X to remove the edges 34 when a connection is to be made, the edge of the screen 26 providing a cutting guide. An insulating plate can be slid between the screen 26 and package 24 so that insulation displacement connections can be made from opposed sides of the cable.

11 Claims, 5 Drawing Figures

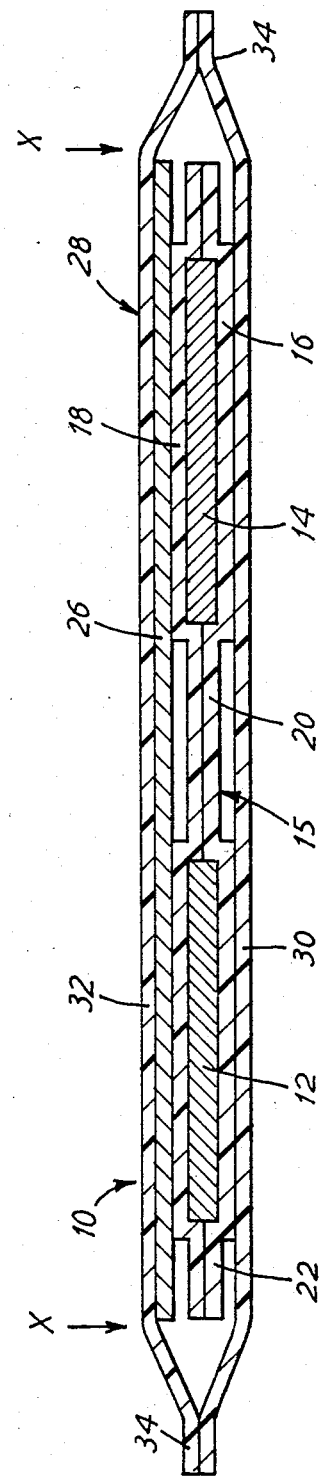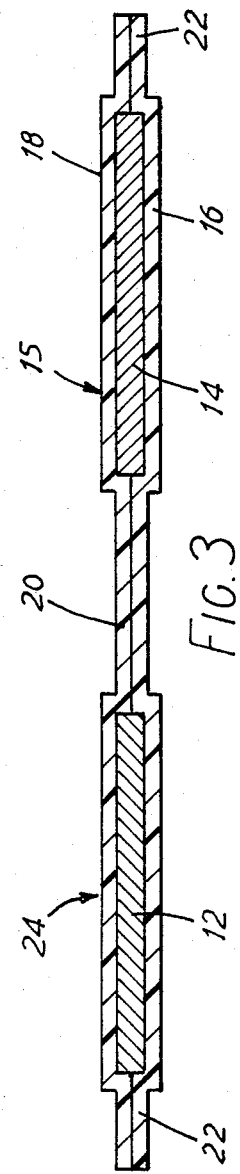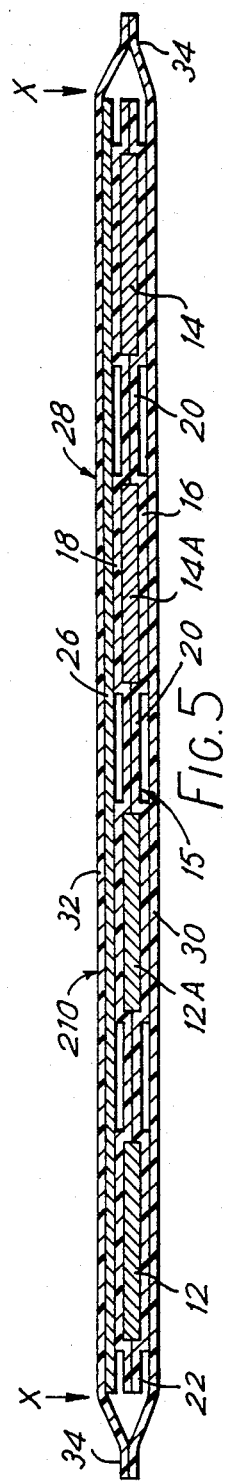

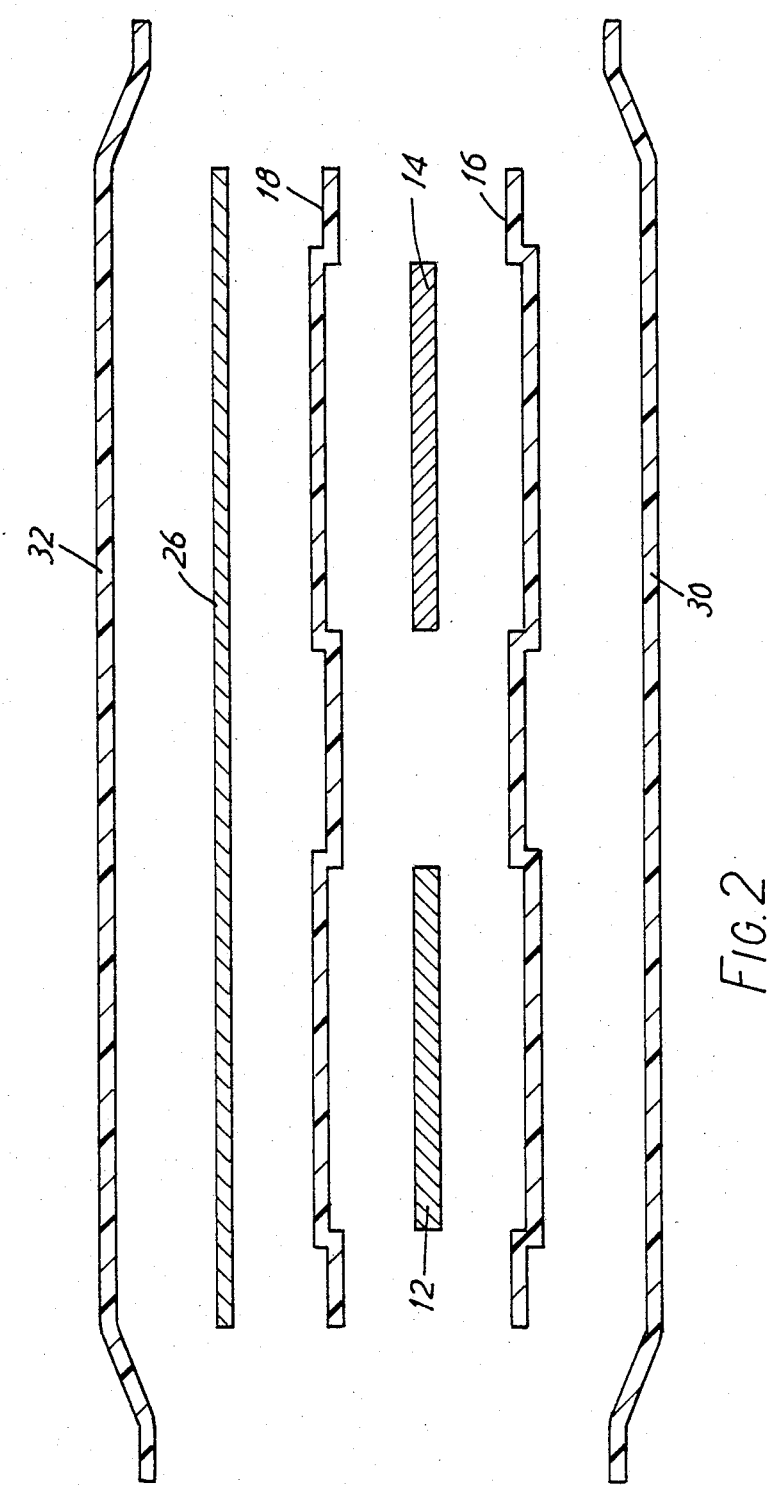

ELECTRIC CABLES

BACKGROUND OF THE INVENTION

1. Field of the Invention

This invention relates to connection flat electrical cables for power distribution of the type designed for undercarpet use.

2. Description of the Prior Art

A known cable construction for such use is described in British Pat. No. 2,052,134. The cable has three flat conductors side by side in an electrically insulating casing. The outer conductors are the live and neutral conductors and the central conductor is the earth conductor. An electrical screen overlies the casing and, in order to be properly earthed, is connected intermittently to the central conductor by welding or riveting.

Such a construction has a number of disadvantages, the main one of which is the difficulty of splicing or tapping into the cable in situ. For splicing, the complex arrangement of British Pat. No. 2,053,586 is proposed which has separate tags to connect the individual conductors. For tapping in a power take-off, the arrangement of European Patent Application No. 844413 can be adopted, but this is not easy to fit in the field owing at least in part to the need to cut a careful shape out of the earthing screen.

Another disadvantage arises from the sharp edges that can be formed on the sides of the cable and ways of alleviating this are discussed in British Pat. No. 2,052,134.

It would be desirable to provide a flat cable that overcame these disadvantages.

SUMMARY OF THE INVENTION

In accordance with this invention, there is provided a flat cable electrical supply system comprising current source means and a flat cable connected thereto, in which the flat cable comprises either two or four side-by-side current-carrying strip conductors, an insulating layer around the conductors to form them into a unitary conductor package, and an earthing screen over the conductor package and insulated from all the conductors in the conductor package, and in which each of the conductors in the conductor package is connected to a respective current-supplying terminal of the current source means and the earthing terminal of the current source means is connected solely to the earthing screen of the cable construction.

This invention further provides a flat cable construction comprising at least two side-by-side current-carrying strip conductors, an insulating layer around the conductors to form them into a unitary conductor package, an earthing screen over the conductor package, and outer insulating means around at least the edges of the cable construction to hold the earthing screen and the conductor package together, the earthing screen being electrically insulated from all the the conductors in the conductor package, and being only lightly bonded to the conductor package so as to be readily separable therefrom by hand.

A preferred cable construction embodying the invention has just two side-by-side current-carrying strip conductors, formed into a unitary conductor package by means of an insulating layer around them. For three-phase applications four conductors are used. A conductive earthing screen overlies the package and is of substantially the same width as the package. An outer insulating layer is formed around the conductor package and the earthing screen by upper and lower strips which are bonded to each other along their edges. The earthing screen is firmly bonded to the upper strip of the outer insulating layer but is preferably only lightly bonded to the conductor package so that it can readily be separated from it by hand. The earthing screen provides the sole earthing conductor in the cable, and is insulated from the current-carrying conductors in the conductor package.

In this way the cable can be terminated relatively easily simply by slitting the edges of the outer insulating layer. The sides of the earthing screen provide a guide indicating where the cut should be made. The earthing screen can then be separated from the conductor package and an insulating plate inserted between them. Insulation displacement contacts can then be used to connect to the current carrying conductors from the underside of the cable and to the earthing screen from the top side.

By not having the screen rigidly connected, as by welding or riveting, to a conductor in the conductor package, so that only the two (or four) current-carrying conductors are in the conductor package, it becomes much easier to provide for connection of the cable. The absence of bulky welds and rivets also makes the cable smoother and hence easier to handle and less likely to be noticed under the carpet, or to suffer wear or cause a wear spot in the carpet.

Nevertheless sideways movement of the earthing screen so as not fully to cover the conductor package is inhibited by the light bonding of these two components. If they are not so bonded, such movement can be inhibited by having the outer insulating layer tightly surround the earthing screen and conductor package. Even so with such an arrangement, as the screen and conductor package are of the same width, they separate particularly easily when the edge portions of the outer insulating layer are removed.

As the outer insulating layer forms a seal around the edges of the cable construction the danger of damage to the electricians hands by sharp edges such as of the earthing screen is reduced.

BRIEF DESCRIPTION OF THE DRAWINGS

FIG. 1 shows a section through a twin-and-earth flat power cable desiged for under-carpet use;

FIG. 2 is an exploded section showing the individual cable components;

FIG. 3 is a section through the sealed inner conductor package forming part of the cable.

FIG. 5 is a section similar to FIG. 1 through a cable designed for three phase applications.

DESCRIPTION OF THE PREFERRED EMBODIMENTS

Figure 4:
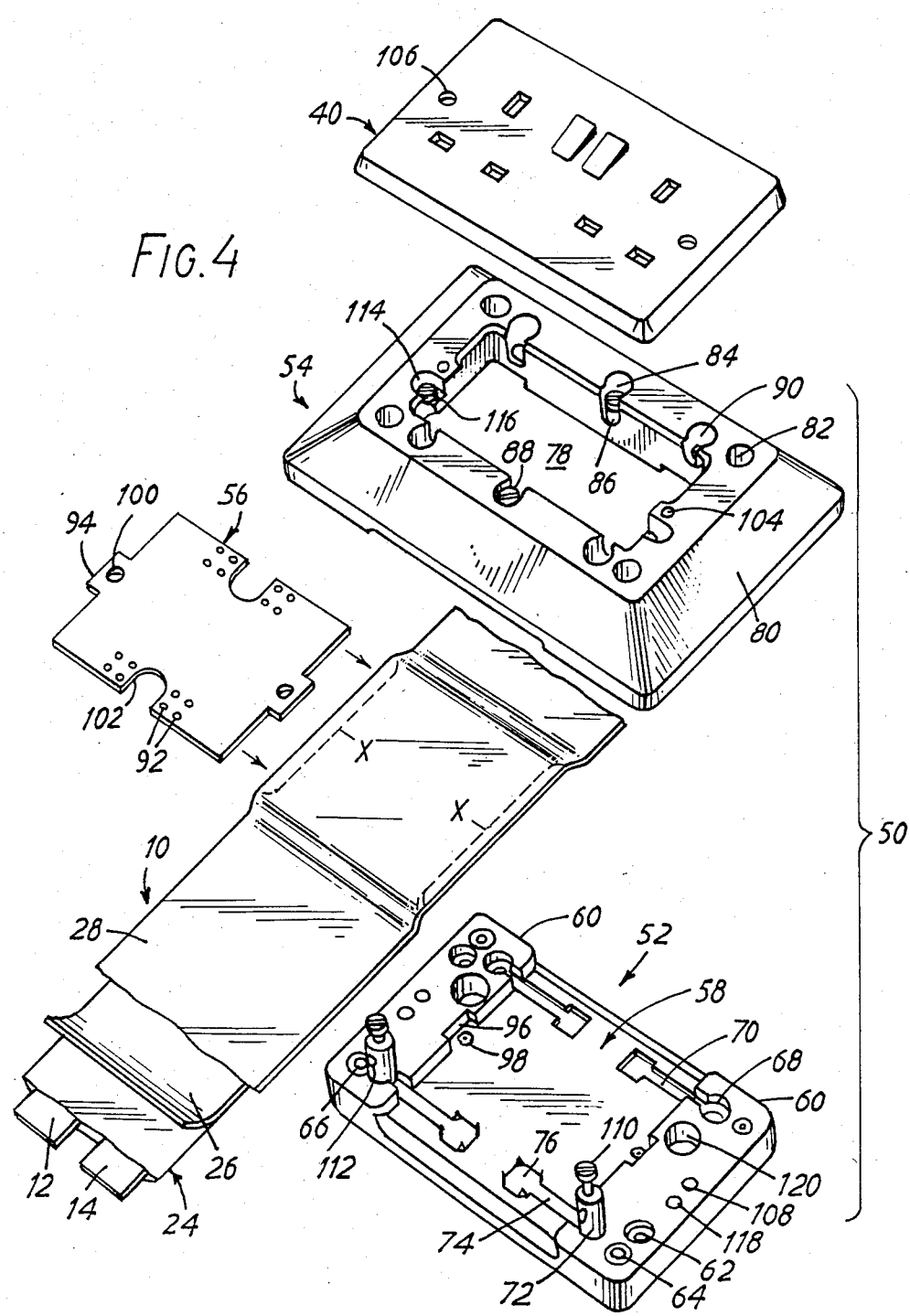
FIG. 4 is an exploded perspective view of an outlet socket and its pedestal mounted on the cable.

The undercarpet cable 10 shown in the figures has a live conductor 12 and a neutral conductor 14. For use on 240 volts with a 30 amp current rating, these conductors are preferably of copper strip about 0.25 mm thick and about 20 mm wide. The thickness and width of the conductors for a 120 volt system may of course vary. These two conductors 12, 14 are sandwiched between two flat films or strips 16, 18 which form an inner insulation sheath 15 and are about 60–65 mm wide. The strips 16, 18 are each conveniently a lamination of a polyester layer of about 0.06 mm thickness on the outer side away from the conductors, a fire retardant vinyl layer also of about 0.1 mm, and a heat-sealable adhesive layer on the innermost side. The total thickness of each strip 16, 18 is about 0.15 mm. The conductors 12, 14 are placed side by side on the lower strip 16 with a space of the order of 10 mm between them, and the upper strip 18 is then applied. The composite is then passed through shaped heat-sealing rollers to cause the conductors to be fully bonded to the sheath, and the two layers of the sheath to be bonded to each other in the regions where there is no conductor. These regions comprise a central region 20 between the conductors, and edge regions 22 to either side of the conductors. The line and neutral conductors 12, 14 are in this way formed into a sealed insulated inner package 24, as shown in FIG. 3.

To form the complete cable a solid copper earthing (or grounding) conductor 26 is now placed over the package 24. The earthing conductor has a width approximately equal to the width of the whole package 24 and acts as an electromagnetic screen, as well as assisting effective heat dissipation and providing a safety function in the event that the cable is penetrated by a foreign body (e.g., a nail). The earthing conductor 26 can normally be about half the thickness of the live and neutral conductors 12, 14. It should be noted that, for the reasons discussed below, the earthing conductor 26 is preferably not bonded to the package 24, but is only sufficiently lightly bonded to be readily separable from it by hand. This bonding may take the form of intermittent bands along the length of the cable.

An outer insulation jacket or sheath 28 is now formed around the combination of the package 24 and earthing conductor 26, by two flat strips 30, 32 which are of the same plastics lamination as the strips 16, 18, only about 20 mm wider. The edges 34 of the strips 30, 32 are then heat sealingly bonded to each other to form a sealed sheath. Preferably also the earthing conductor 26 is bonded to the upper strip 32 and the package 24 can be lightly bonded, for example at intermittent bands along the cable, to the lower strip 30. The completed cable is then typically about 80-85 mm wide and 1 mm thick. The sheath 28 has the effect of sealing the edge portion of the cable construction, and attaching the edge of the earthing conductor 26 to the edge of the package 24 to hold them together. If the sheath 28 is sufficiently tightly heat sealed around the package 24 and earthing screen 26, the screen 26 is rigidly held relative to the package 24 and does not need to be bonded to it.

It should be noted that FIG. 1 is not to scale and has been expanded in the direction of the thickness of the cable to show the construction more clearly. In fact, at the edges 34 of the outer strips 30,32 the two strips will be bonded together closely up to the outer edges of the screen 26 and conductor package, thus forming a sheath which tightly surrounds the screen and conductor package. However, the upper strip 32 does not become bonded to the conductor package 24 and the lower strip does not become bonded to the earthing screen 26.

The outer sheath 28 preferably carries indications, e.g. by color coding, as to which is the top and which is the live conductor. If desired a second earthing conductor can be placed beneath the conductor package to provide further electrical and mechanical protection and also to enable the cable to be used either way up. This enables the cable to made to change direction by a simple fold.

The dimensions given above are for a 240 volts 30 amp cable with twin and earth conductors. In any event the strip conductors 12, 14 will normally have a width which is at least ten times their thickness. For three-phase applications an additional two current-carrying conductors can be incorporated and the overall size varied to give the required performance characteristics. This is illustrated in FIG. 5 where there are two further current-carrying conductors 12A, 14A in addition to the conductors 12, 14, making a total of four such conductors. In other respects, the cable is based on that of FIG. 1 and is not therefore described again in detail.

The cable is installed underneath the carpet in an office or like environment. The cable is laid on the floor and covered by a steel tape which provides mechanical protection and which is secured to the floor by adhesive tape. The carpet can then be replaced over the cable.

FIG. 4 illustrates the mounting of a socket outlet 40 on the cable 10. This is achieved by means of a box or pedestal 50 which is moulded of rigid plastics material and comprises a base unit 52 and an upper clamp unit 54, together with an insulation plate 56. The socket outlet 40 is a standard socket outlet appropriate to the type of plug connector to be received, and in the United Kingdom can be a twin socket outlet in accordance with the relevant British Standard (BS 1363) as designed for flush or surface wall mounting. No special socket outlet unit is required. The socket outlet will normally have screw connectors designed to receive an input power cable of conventional type.

The base unit 52 is of generally rectangular shape and has a broad transverse recess 58 forming a surface across which the flat cable 10 is laid. The end pillars 60 to either side of this recess 58 contain various moulded bores. These include two bores 62 near two opposed corners of the base unit for receiving fixing screws, if the pedestal is to be mounted on a wooden floor, or masonary or concrete fixing devices for other floors. At the four corners of the base unit there are bores 64 which each accommodate a threaded bush 66 to receive a bolt (not shown) which secures the clamp unit 54 to the base unit.

Four bores 68 are also provided which open towards the transverse recess 58 and communicate with shallow channels 70 in the base of the recess. At least two of these bores, one on each pillar 60, receive screw terminals 72 which are connected by a copper strip 74 to an insulation-displacement contact (IDC) 76 to form a unitary contact member. The contact 76 comprises a square plate the corners of which are bent upwards as shown to provide four sharp contact points, capable of penetrating the insulating sheath of the cable 10 to make good electrical contact with the live and neutral conductors 12 and 14.

The clamp unit 54 is designed to fit over and around the base unit 52 and with the assistance of the plate 56 to press the package 24 in the cable 10 down onto the IDC contacts 76 so that proper contact is made. The clamp unit 54 is of the same general shape as the base unit but has a central aperture 78 for receiving the rear of the socket outlet 40 and associated wiring, and also a larger flange 80 which bears against the floor (or may be relieved to receive the edge of the carpet). Four bores 82 accommodate the bolts (not shown) which are received in the threaded bushes 66 in the base unit. When the bolts are tightened the necessary clamping force is applied to the cable. Preferably the bolts are of the type which take a hexagonal Allen key so that they can provide a large clamping force. Bores 84 adjacent the aperture 78 in the center of the longer side of the clamp unit (the side which runs transverse to the cable) each accommodate a captive IDC terminal post 86. The lower end of the post 86 is conically pointed to form an insulation displacement contact which provides an earth termination to the earth conductor 26 in the cable 10. The upper end of the post 86 is provide with a screw terminal 88 similar to the screw terminals 72 for the live and and neutral conductors. Further bores 90 are aligned above the four possible positions of the terminal posts 72, and open into the aperature 78.

The manner in which the cable is connected to the pedestal will now be described.

The cable is laid across the floor and the desired position for an outlet socket is chosen. A hole of appropriate size is made in the carpet. At this point the electrician has to gain access to the cable conductors. This he does with a sharp knife by slitting or cutting off the edges 34 of the outer sheath 28 in the region that will be lying over the recess 58. The line of the cut is shown at X in FIG. 1 and by the dashed lines X in FIG. 4. With the cable described, making these cuts in the right place is very easy. It will be recalled that the earthing conductor 26 is at least as wide as the conductor package 24. Thus all the electrician has to do is to feel for the edge of the earthing conductor 26, and to cut alongside it. In this way he removes the edge portions 34 which bond the two halves of the outer sheath together, but he is in no danger of violating the live and neutral conductor package 24.

The electrician may separate the lower layer 30 of the outer sheath, which is only relatively lightly bonded to the package 24, and pass it under the base unit 52 to form a dust shield under the pedestal.

It will also be recalled that the earthing conductor 26 was not bonded to the conductor package 24 or at least not firmly bonded. Thus over the length where the edges 34 are removed, the cable can easily be separated into two parts with a gap between them. The top part consists of the top outer insulating strip 32 and the earthing conductor 26, and the bottom part consists of the bottom outer insulating strip 30 and the conductor package 24, the latter containing the live and neutral conductors 12 and 14 in the inner insulating sheath 15. In particular, this is possible and practicable because the conductor package 24 does not include an earthing conductor; rather the sole earthing path is through the screen 26. In the prior constructions mentioned above which have included an earthing conductor in the conductor package it has been necessary to rivet or weld the screen to the earthing conductor so that the screen does not float electrically and is itself earthed. That has then made it difficult to provide ready connection to the cable.

On the other hand, if the screen is totally unbonded to the conductor package there is a danger that in use the screen could "wander" sideways so that it did not properly cover the current-carrying conductors. This would, of course, be most undesirable as it makes the cable electrically unsafe. Any sharp object penetrating from above might be able to reach the live conductor without having to pass through the screen. Therefore, the screen is preferably lightly bonded to the conductor package in such a way as to stop movement between the screen and the package in normal use. However, the bonding is sufficiently light for the electrician to be able to separate the two in the field giving the advantages noted above in making a connection to the cable.

Alternatively, the outer sheath tightly surrounds the conductor package and the earthing screen to provide the necessary fixed location of the screen over the conductors in the conductor package.

Despite this tight bonding together of the cable construction into a unitary whole, because the upper insulating strip 32 is bonded only to the earthing screen 26 and not to the conductor package 24, and the lower insulating strip is bonded (preferably only lightly) to the conductor package 24 but not to the earthing screen 26, it is very easy to separate the earthing screen 26 and consider package 24 by just removing the edge portions of the strips 30,32. Where the earthing screen 26 and conductor package 24 are not bonded to each other they just fall apart.

Next the electrician takes the third element of the pedestal 50, namely, the insulating plate 56. This is of the same general shape as the recess 58 across which the cable lies. The electrician slides this plate between the two separated parts of the cable and places it over the recess 58. The clamp unit 54 is placed on top and the clamping bolts in bores 82 are tightened into bushes 66. The clamping force is sufficient to force the bottom part of the cable down onto the contacts 76 to cause the contact points to penetrate the insulation and make contact with the live and neutral conductors 12 and 14 respectively, and to cause the contact point of the terminal post 86 to penetrate the earth conductor 26.

To assist in this the plate 56 has bores or recesses 92 which are aligned with the points of the contacts 76. To maintain the alignment of the plate 56, the plate has rectangular projections 94 at either end which slide into corresponding recesses 96 in the inside edges of the pillars 60. The base plate 52 may optionally include threaded bushes 98 at this point, in which case the plate 56 has corresponding holes 100. A bolt can then be passed through each hole 100 into the bush 98 and tightened to hold the plate 56 and hence the bottom part of the cable in place for the subsequent assembly stages.

The plate 56 is of such a thickness that there can be no danger of the contacts 76 penetrating from the underside as far as the top surface of the plate to make contact with the earth, or the earth IDC penetrating from the upper side to make contact with the live and neutral conductors below. To assist in allowing penetration of the conductor the plate has cut-outs 102.

The plate 56 can have appropriate instructions printed on it to assist the electrician in installing the socket outlet correctly.

Now the pedestal is completed and it remains only to attach the standard socket outlet 40. For this purpose the clamp unit 54 has two threaded bushes 104 at the required spacing at either end of the aperture 78. Conventional fixing bolts (not shown) pass through holes 106 in the socket outlet 40 and engage in bushes 104. The base unit 52 has two bores 108 which receive the ends of these fixing bolts should they protrude through the clamp unit 54.

In use it is, of course, necessary to complete the electrical connections to the socket outlet 40 before it is bolted in place. The terminal posts 72 protrude through the bores 90 in the clamp unit 54, so that the screw terminals 110 are accessible from above and the wire-receiving transverse bores 112 in the terminal posts are open into the aperture 78. In the example illustrated in FIG. 4 there are two terminal posts 72, one for each of the live and neutral conductors 12 and 14, and this will be the usual arrangement. A short length of insulated wire is then run from the terminal posts to the terminals on the rear of the standard twin switched socket 40. The earth connection is provided by a further length of wire between the respective terminal on the socket 40 and the screw terminal 88 at the top of terminal post 86 which makes direct contact with the earth conductor 26 in the cable. This type of connection is familiar to electricians and so is easy to make and most unlikely to be made incorrectly. As the pedestal 50 provides a standard fixing for the socket 40, alternative types of outlet can be used which have the same fixing parameters.

An advantage of the system illustrated is that if it is desired to remove the socket outlet from the position in which it is installed, this can be done without difficulty. The only damage done to the cable is to make small pinpricks in the insulation.

The same basic pedestal can be used in other different configurations. Different types of outlet socket can be mounted by using a spacer or adaptor moulding mounted on the clamp unit, or alternatively by incorporating the necessary adaptation in the shape of the clamp unit. The pedestal illustrated can also be used to join two lengths of cable 10, or as a transition box to join a length of conventional supply cable to the flat cable 10, as will now be described.

When used as a junction box to join two lengths of flat cable, the pedestal includes four of the terminal posts 72 and associated insulation displacement contacts 76 spaced in the recess 58. The cable lengths are cut so as to terminate in the middle of the recess, and thus the contacts 76 at one end of the recess 58 will embed in one of the cable ends and those at the other end of the recess in the other cable end. The live and neutral connections are completed by short lengths of wire between the terminal posts 72, and the earth connections by a short length of wire between terminal posts 86. A socket 40 can be mounted on such a junction box or, if no socket is required at that point, a conventional plain blanking plate can be used. This system is particularly useful in that it enables an existing cable length terminating at a socket outlet to be extended by an additional length of cable without the need to replace the existing length with a longer length.

A modification of the junction box can be used to connect different cable runs at an angle. For example, a square box can be constructed to join cables at right angles and basically triangular boxes to join cables at other angles.

Finally, the pedestal 50 can be used as a transition box to connect the cable to a conventional 2.5 mm² twin and earth power cable, or similar, such as used on a ring main. In this case the pedestal is mounted over an existing type of recessed conduit box secured to the wall near the floor or to the floor itself. The clamp unit 54 has two extra recessed bores 114 (next to the bushes 104 and at the same spacing as them) which receive fixing bolts 116 of the same gauge as used in the bores 106 to mount the socket 40. These fixing bolts pass through bores 118 in the base unit and engage in the threaded holes or bosses in the conduit box (not shown). Thus the cable 10 is first mounted in the pedestal in the manner previously described, and the bolts 116 tightened up. The incoming power cable is then passed through a hole 120 in the base unit 52 and terminated on the terminal posts 72 for the live and neutral conductors and the bolt 88 for the earth conductor. Two holes 120 are provided so that two cables can be accommodated if ring main wiring is used to supply the conduit box. Finally either a socket 40 or a blanking plate can be mounted on the pedestal, as described above.

In this way the cable 10 can for example be connected to an existing wall mounted socket outlet, running down the wall from the socket and then along the floor under the carpet for as far as is desired. Sockets can be mounted on the cable wherever required along its length. The conductors 12, 14 in the cable are connected to the live and neutral supply, while the supply earth is connected solely to the earthing conductor screen 26. As there is no need with this cable construction for the conductor package to include an earth conductor, the overall cable width is sufficiently narrow to fit conveniently under a standard socket outlet unit.

Because the bolts 116 are not quite on the center line of the base unit (the bores 104 are in the way), the pedestal 50 and hence the socket 40 sits slightly asymmetrically on the conduit box. This does not matter because the pedestal is wider than the socket outlet normally used on the conduit box. While the bolts 116 are shown as holding the whole assembly 50 on the conduit box, in an alternative arrangement they could secure only the base unit 52 to the conduit box, the bores 118 being suitable countersunk to receive the heads of the bolts.

The cable and pedestal cooperate to provide an extremely effective power distribution system for under-carpet use. The cable provides the current-carrying conductors with two layers of insulation, but is constructed so as to facilitate terminating and joining the cable. The pedestal takes advantage of the cable construction and provides a simple but adaptable mounting which can be used in various configurations, namely with standard outlet sockets, or as an junction box to join two like cable lengths, or as a transition box to join the flat cable to a conventional cable, or to perform two of these functions simultaneously.

I claim:

1. A flat cable electrical supply system comprising current source means and a flat cable connected thereto, in which the flat cable comprises either two or four side-by-side current-carrying strip conductors, an insulating layer around the conductors to form them into a unitary conductor package, and an earthing screen over the conductor package and insulated from all the conductors in the conductor package, and in which each of the conductors in the conductor package is connected to a respective current-supplying terminal of the current source means and the earth terminal of the current source means is connected solely to the earthing screen of the cable construction, said earthing screen being only lightly bonded to the conductor package so as to be readily separable therefrom by hand, and including outer insulating means around at least the edges of the cable construction to hold the earthing screen and the conductor package together, said earthing screen being substantially the same width as the conductor package whereby the edges of the outer insulating means can be cut away along the edge of the earthing screen without penetrating the conductor package.

2. A flat cable electrical supply system according to claim 1, in which the outer insulating means comprises an outer insulating layer around the conductor package and the earthing screen.

3. A flat cable electrical supply system according to claim 2, in which the outer insulating layer tightly surrounds the earthing screen and the conductor package to inhibit relative movement thereof.

4. A flat cable electrical supply system according to claim 3, in which the outer insulating layer comprises upper and lower insulating strips each wider than the earthing screen and the conductor package and bonded along their edges.

5. A flat cable electrical supply system according to claim 4, in which the upper insulating strip is lightly bonded to the earthing screen.

6. A flat cable electrical supply system according to claim 5, in which the lower insulating strip is intermittently bonded to the conductor package.

7. A flat cable construction comrpising at least two side-by-side current-carrying strip conductors, an insulating layer around the conductors to form them into a unitary conductor package, an earthing screen over the conductor package, and outer insulating means around the cable construction to hold the earthing screen and the conductor package together, the earthing screen being electrically insulated from all the conductors in the conductor package, and being only lightly bonded to the conductor package so as to be readily separable therefrom by hand, said earthing screen having substantially the same width as the conductor package whereby the edges of the outer insulating means can be cut away along the edge of the earthing screen without penetrating the conductor package, said outer insulating means comprising an outer insulating layer around the conductor package and the earthing screen, said outer insulating layer comprising upper and lower insulating strips each wider than the earthing screen and the conductor package and bonded along their edges.

8. A flat cable construction according to claim 7, in which the upper insulating strip is lightly bonded to the earthing screen.

9. A flat cable construction according to claim 8, in which the lower insulating strip is intermittently bonded to the conductor package.

10. A flat cable construction comprising at least two side by side current-carrying strip conductors, an insulating layer around the conductors to form them into a flat unitary conductor package, an earthing screen of substantially the same width as the conductor package overlying the conductor package, the earthing screen being electrically insulated from all the conductors in the conductor package, and outer insulation means around the earthing screen and conductor package and comprising upper and lower insulating strips each wider than the earthing screen and the conductor package, the upper and lower insulating strips being bonded along their edge portions so as to tightly surround the earthing screen and the conductor package to inhibit relative movement thereof, said upper insulating strip being only lightly bonded to the earthing screen but not bonded to the conductor package, and the lower insulating strip being bonded to the conductor package but not to the earthing screen, to permit ready separation of the earthing screen and conductor package by cutting away of the edge portions of the upper and lower insulating strips.

11. A flat cable construction according to claim 10, in which the lower insulating strip is intermittently bonded to the conductor package.

* * * * *